United States Patent [19]
Kersey

[11] Patent Number: 5,987,197
[45] Date of Patent: Nov. 16, 1999

[54] ARRAY TOPOLOGIES FOR IMPLEMENTING SERIAL FIBER BRAGG GRATING INTERFEROMETER ARRAYS

[75] Inventor: Alan D. Kersey, South Glastonbury, Conn.

[73] Assignee: CiDRA Corporation, Wallingford, Conn.

[21] Appl. No.: 08/966,260

[22] Filed: Nov. 7, 1997

[51] Int. Cl.$^6$ .............................. G02B 6/28; G01B 9/02
[52] U.S. Cl. .............................. 385/24; 385/12; 385/37; 356/345; 250/227.23
[58] Field of Search .................. 385/12, 13, 24, 385/37; 356/345, 35.5, 349; 250/227.14, 227.18, 227.17, 227.19, 227.23

[56] References Cited

U.S. PATENT DOCUMENTS

| | | | |
|---|---|---|---|
| 5,680,489 | 10/1997 | Kersey ......................................... | 385/12 |
| 5,754,293 | 5/1998 | Farhandiroushan ...................... | 356/345 |
| 5,818,585 | 10/1998 | Davis et al. ............................. | 356/345 |

FOREIGN PATENT DOCUMENTS

| | | |
|---|---|---|
| 2284256 | 5/1995 | United Kingdom . |
| 2311131 | 9/1997 | United Kingdom . |

OTHER PUBLICATIONS

"Progressive ladder network topology combining interferometric and intensity fiber–optic–based sensors", Applied Optics vol. 34, No. 28/ Oct. 1, 1995, pp. 6481–6488.

"64–Element Time–Division Multiplexed Interferometric Sensor Array with EDFA Telemetry" by A. D.Kersey et al, pp. 270–271—vol. 2 —1996 Technical Digest Series—Conference Edition for OFC '96—Optical Fiber Communication Feb. 25–Mar. 1, 1996—San Jose Convention Center, San Jose, CA.

"An Hybrid WDM/TDM Reflectometric Array" by Sandeep Vohra et al, pp. 534–537—Conference Proceedings—OFS–11 Eleventh International Conference on Optical Fiber Sensors—Advanced Sensing Photonics—May 21–24, 1996.

*Primary Examiner*—Hemang Sanghavi

[57] ABSTRACT

An interferometer array includes a plurality of interferometer sub-arrays, each sub-array including a plurality of interferometers. Each interferometer in a sub-array is implemented with a respective pair of fiber Bragg gratings and a sensing length of optical fiber positioned between the respective pair of fiber Bragg gratings. The fiber Bragg gratings in each respective pair of fiber Bragg gratings have the same characteristic wavelength that is different from the characteristic wavelength of every other pair of fiber Bragg gratings in the sub-array. The sub-arrays are interconnected to minimize the common-wavelength crosstalk between the sensors in the overall interferometer array. In one embodiment, the sub-arrays are connected in series along a common length of optical fiber such that the maximum common-wavelength crosstalk is limited by the number of sub-arrays connected in series. In a second embodiment of the invention, branches are interconnected to a common input/output optical fiber via optical couplers, and each branch has one or more sub-arrays connected in series. The common-wavelength crosstalk is limited by the number of arrays in each sub-array. In a third embodiment of the invention, branches are interconnected between an input optical fiber and an output optical fiber via optical couplers, and each branch has one or more sub-arrays connected in series. Optical signal delay elements are positioned in the input optical fiber to incrementally increase the delay experienced by an input optical signal before it reaches each successive branch connected to the input optical fiber. Therefore, the return optical signals from each sub-array in a branch are separated in time from the return optical signals from the sub-arrays in the other branches.

17 Claims, 7 Drawing Sheets

ARRAY TOPOLOGIES FOR IMPLEMENTING SERIAL FIBER BRAGG GRATING INTERFEROMETER ARRAYS

TECHNICAL FIELD

The present invention relates to multiplexed intrinsic fiber optic elements, and more particularly, to improved array topologies for serial fiber Bragg grating interferometer arrays.

BACKGROUND OF INVENTION

A sub-array of interferometers can be configured in a single fiber by utilizing a series of weakly reflecting fiber Bragg grating elements at a particular wavelength, along the fiber, spaced at an interval L. The fiber lengths between the gratings form interferometers, as light from a laser (at a wavelength matched to that of the gratings) passing down the fiber reflects off each grating. To isolate the interferometric effects from just one pair of gratings (i.e. one particular length L), the light coupled into the fiber can be pulse modulated. This produces a series of pulse returns from the array, as illustrated in FIG. 1. If the light from the array is fed to an interferometer, e.g. a Mach Zehnder, the path-difference between the arms of which is equal to the round-trip distance between two adjacent fiber Bragg grating reflectors in the array (2L), then a differential interferometer is formed. Such a path matching (compensating) interferometer is illustrated in FIG. 1.

Referring to FIG. 1, light which reflects off the first fiber Bragg grating reflector, but travels the long arm in the compensating interferometer travels the same optical distance as the light which reflects off the second fiber Bragg grating reflector, but passes through the shorter arm of the compensating interferometer. Referring also to FIG. 2, these optical components interfere at the output of the compensating interferometer, producing an interference signal the phase of which depends on phase perturbations in the fiber length L between the two fiber Bragg grating reflectors. This path matching occurs for any subsequent pair of fiber Bragg grating reflections along the array, resulting in a series of time-separated outputs from the compensating interferometer, each representing the phase a sequential length L of the fiber.

The system described above with respect to FIGS. 1 and 2 allows a sub-array of interferometers to be formed in a single fiber. However, such a system produces crosstalk due to the fact that optical pulses reflecting off one of the fiber Bragg grating elements in the array can undergo subsequent reflections at other fiber Bragg gratings and interfere with normally produced optical returns. This problem is illustrated in FIG. 3. Referring to FIG. 3, an array that comprises eight (8) fiber Bragg grating elements at a particular wavelength is illustrated, with each sensor element immediately adjacent to the next. Other topologies are possible and may be more desirable, but the fundamental source of crosstalk remains the same. A 'primary optical return' from the array is defined as an output optical pulse generated from the input optical pulse which undergoes a single reflection from a fiber Bragg grating element. For a low reflectivity fiber Bragg grating, say 1%; the return signal is approximately 1% of the input source power. For the eight (8) fiber Bragg grating system shown, eight (8) primary pulses are generated (for seven (7) sensor lengths).

A pulse reflection off one fiber Bragg grating can also be reflected a second and third time off other fiber Bragg gratings and will produce a very weak return signal (down by R^3 on the input light level). This weak light signal exits the array in a time slot that would be associated with that of a primary optical return, and thus gives rise to crosstalk. The fact that the weak signal is interferometrically mixed with the stronger primary signal means that this source of crosstalk can be significant unless very weak grating reflectors are used. The number of secondary crosstalk pulses in the array increases strongly with the number of sensors multiplexed, and this may lead to unacceptably high crosstalk.

There therefore exists a need for an improved array topology for serial fiber Bragg grating interferometer arrays that reduces the crosstalk between the individual interferometers in the array.

SUMMARY OF THE INVENTION

An object of the present invention is to provide improved array topologies for implementing serial fiber Bragg grating interferometer arrays that minimize or eliminate common-wavelength crosstalk between the various interferometers in the array.

Another object of the invention is to provide such array topologies that minimize common-wavelength crosstalk while allowing an increased number of interferometers in the array.

A still further object of the invention is to provide such an array that also provides balanced returns from the various interferometers in the array.

According to the present invention, an interferometer array includes a plurality of interferometer sub-arrays, each sub-array including a plurality of interferometers, each interferometer being implemented with a respective pair of fiber Bragg gratings and a sensing length of optical fiber positioned between the respective pair of fiber Bragg gratings, the fiber Bragg gratings in each respective pair of fiber Bragg gratings having the same characteristic wavelength that is different from the characteristic wavelength of every other pair of fiber Bragg gratings in the sub-array. Sub-array interconnection means are utilized to interconnect the sub-arrays to form the interferometer array and to minimize the common-wavelength crosstalk between the various interferometers in the interferometer array.

In accordance with a first aspect of the invention, the sub-arrays are connected in series along a common length of optical fiber such that the maximum common-wavelength crosstalk is limited by the number of sub-arrays connected in series.

In accordance with a second aspect of the invention, branches are interconnected to a common input/output optical fiber via optical coupling means, and each branch has one or more sub-arrays connected in series. The common-wavelength crosstalk is limited by the number of sensors at each wavelength in each sub-array.

In further accord with the second aspect of the invention, the fiber Bragg gratings in branches that are more distal from an optical signal source are made more reflective than fiber Bragg gratings in the branches that are closer to the optical signal source such that the return signals from the various sensors in the array are generally balanced with respect to one another in terms of power.

In accordance with a third aspect of the invention, branches are interconnected between an input optical fiber and an output optical fiber via optical coupling means, and each branch has one or more sub-arrays connected in series. Optical signal delay means are positioned in the input optical fiber to incrementally increase the delay experienced by an input optical signal before it reaches each successive branch connected to the input optical fiber. Therefore, the return optical signals from each sub-array in a branch are separated in time from the return optical signals from the sub-arrays in the other branches.

The present invention provides a significant improvement over the prior art. Utilizing the array topologies of the invention significantly reduces the common-wavelength crosstalk between multiple interferometers in the array. Additionally, the arrays may be configured to provide generally balanced return signals (in terms of power) from the various sensors in the array. In one embodiment of the invention, the reflectivity of the various fiber Bragg gratings in the array are varied such that balanced returns are received from the various sensors in the array. In another embodiment of the invention, the number of couplers that an optical signal must traverse is minimized, therefore minimizing attenuation caused by the couplers and providing balanced optical returns. The present invention provides the benefits of reduced crosstalk while at the same time allowing an increased number of interferometeric sensors in the array.

The foregoing and other objects, features and advantages of the present invention will become more apparent in light of the following detailed description of exemplary embodiments thereof, as illustrated in the accompanying drawings.

DETAILED DESCRIPTION OF THE INVENTION

The present invention provides improved array topologies for multiplexed fiber Bragg grating interferometer arrays that significantly reduce crosstalk between the individual interferometers in the array while at the same time increasing the number of interferometers in the array, as compared to the prior art. The present invention utilizes array topologies based on a wavelength division multiplexed array of Bragg grating interferometers. By utilizing this basic array topology in various array configurations, the number of interferometers in the array may be significantly increased without an unacceptable level of crosstalk between the individual interferometers in the array.

Figure 4:
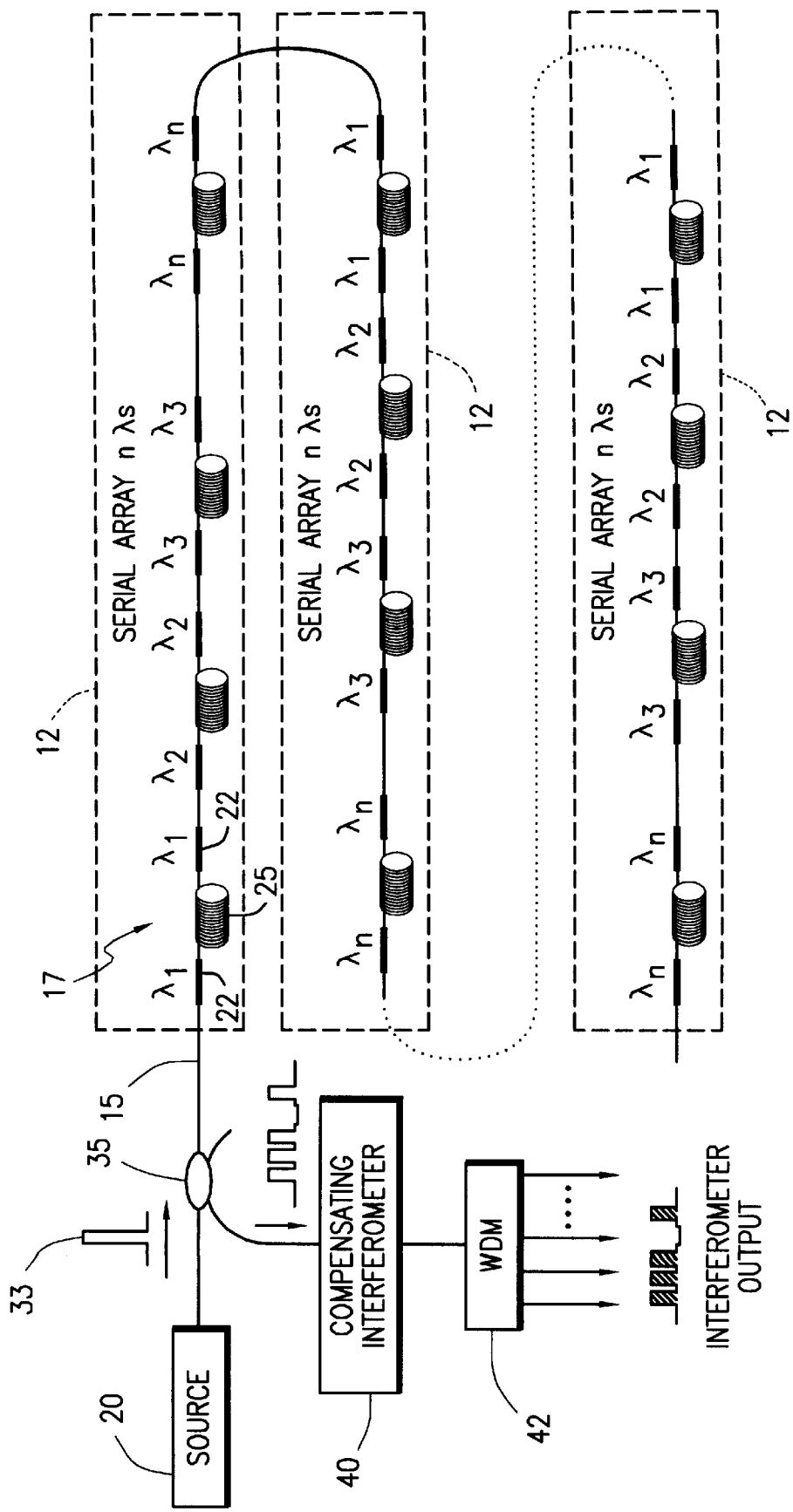
FIG. 4 is a schematic block diagram of a multiplexed interferometer system utilizing a first embodiment of a serial fiber Bragg grating interferometer array in accordance with the present invention.

The prior art crosstalk effect between interferometers implemented using Bragg gratings all of the same central wavelength can be negated significantly by employing gratings at different wavelengths to define sets of interferometers at different wavelengths along the array. Referring to FIG. 4, a plurality of serial arrays 12 (sub-arrays) are interconnected to one another along the length of an optical fiber 15. Each sub-array 12 includes a plurality of interferometers 17. Each interferometer 17 includes a pair of Bragg gratings 22 and a length of sensing optical fiber 25 positioned between the Bragg gratings 22. The sensing length of optical fiber 25 may be wrapped on a mandrel in a hydrophone configuration as illustrated in FIG. 4. Alternatively, the sensing optical fiber 25 may be in any suitable configuration such that it is responsive to strain for providing an interferometeric strain sensor. The pair of Bragg gratings 22 has the same characteristic wavelength $\lambda_n$ such that the interferometer is uniquely identified by its characteristic wavelength $\lambda_n$. However, each of the interferometers 17 in the sub-array 12 has a different characteristic wavelength $\lambda_n$ such that each of the plurality of interferometers 17 is uniquely identified by its characteristic wavelength $(\lambda_1, \lambda_2, \ldots, \lambda_n)$.

Figure 1:
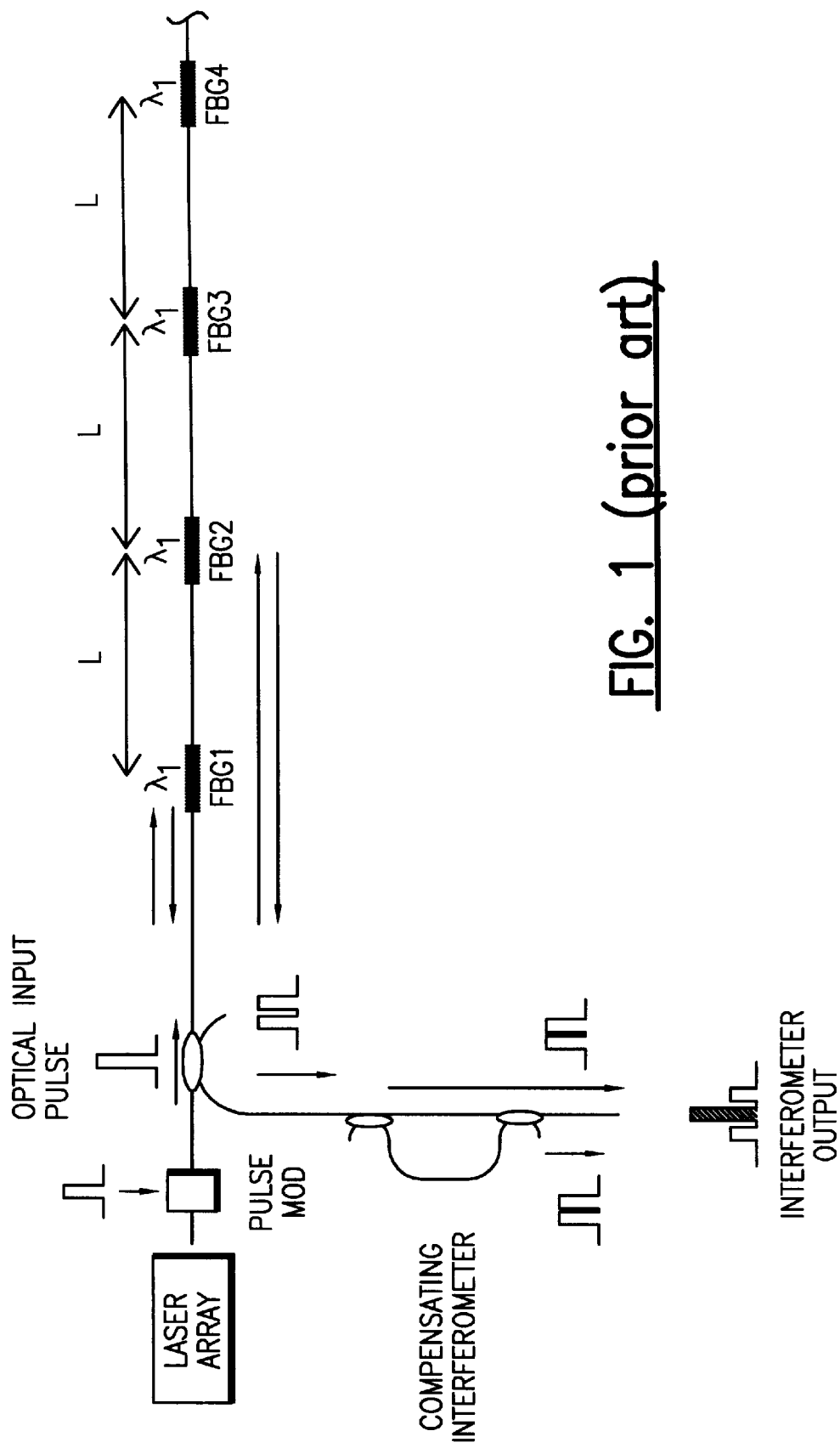
FIG. 1 is a schematic block diagram of a multiplexed interferometer system having a prior art fiber Bragg grating interferometer array.
Figure 2:
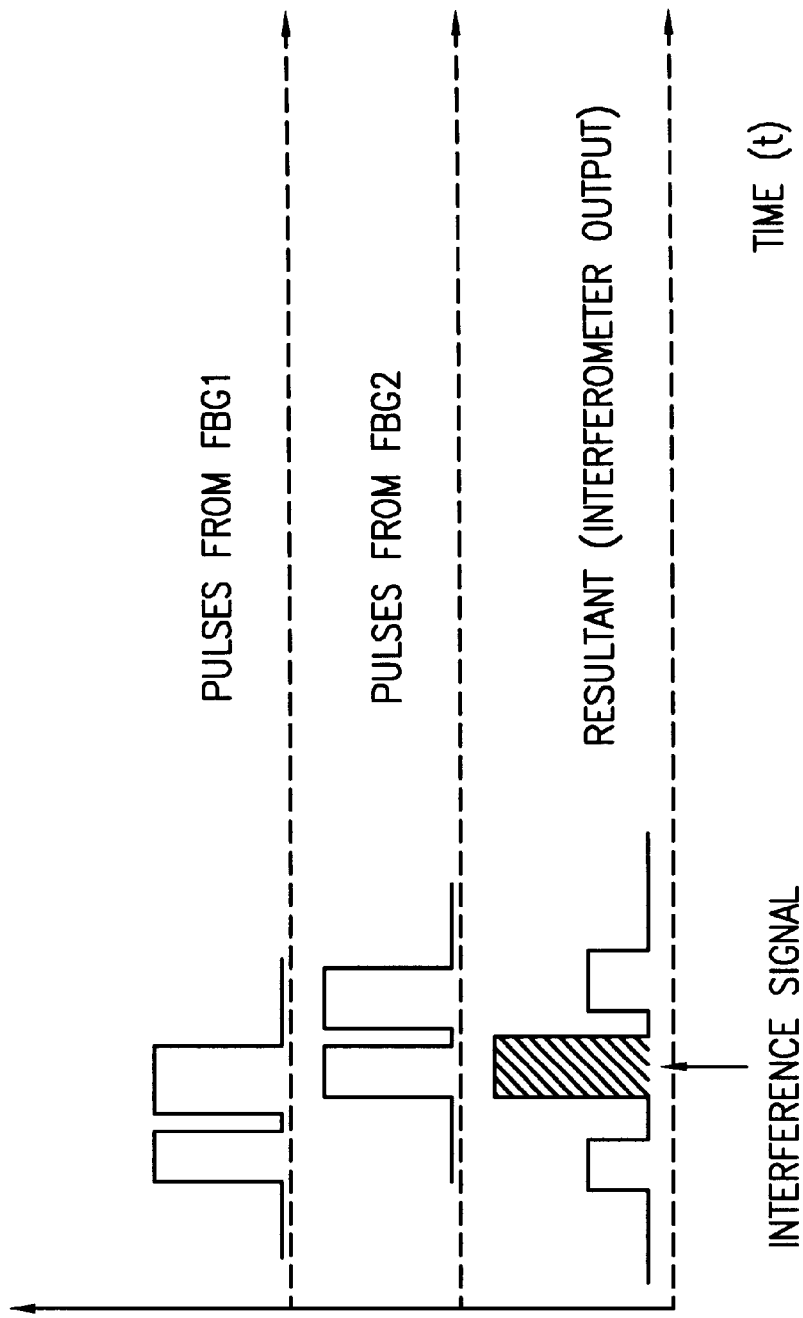
FIG. 2 is pulse timing diagram showing the interference signal produced by a compensating interferometer in the system of FIG. 1.
Figure 3:
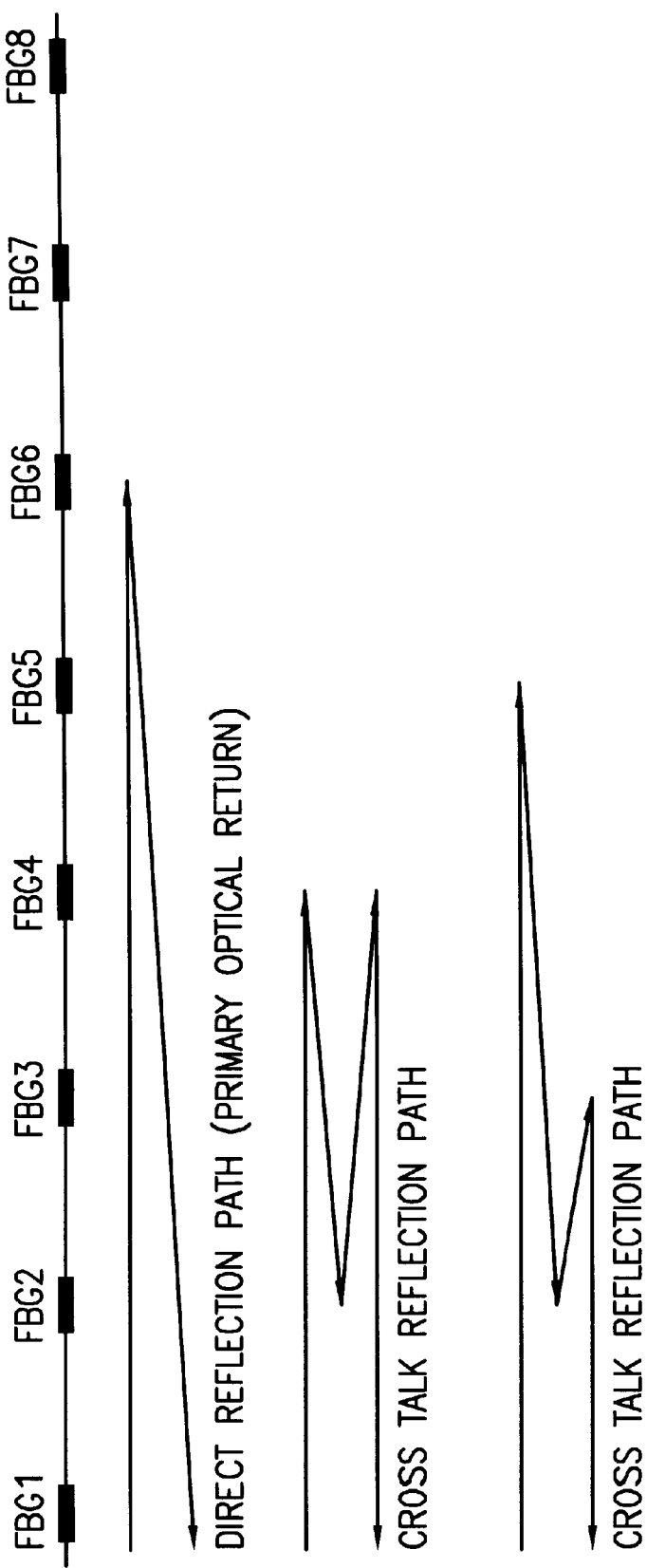
FIG. 3 is a diagram showing a direct reflection path and cross talk reflection paths of optical signals in the fiber Bragg grating interferometer array of FIG. 1.

A light source 20, such as a pulsed laser, provides an input optical signal 33 to the optical fiber 15. Each interferometer 17 in each sub-array 12 provides a primary optical return that is provided via a coupler 35 to a compensating interferometer 40. As described with respect to FIG. 2, each fiber Bragg grating in a pair of fiber Bragg gratings 22 that form an interferometer 17 provides a primary optical return. The compensating interferometer 40 is responsive to these primary optical returns for providing an interference signal the phase of which depends on phase perturbations in the length of sensing optical fiber 25. The output from the compensating interferometer 40 is provided to a wavelength division multiplex (WDM) filter 42 that provides a unique output for each interferometer 17 in the sub-array 12 based on its characteristic wavelength $(\lambda_1, \lambda_2, \ldots, \lambda_n)$.

The return signals from the different interferometers 17 in the different sub-arrays 12 are uniquely distinguished from one another utilizing time division multiplexing (TDM) techniques. This technique is utilizes the delay time between receipt of return signals from different interferometers 17 based on their physical separation along the length of the fiber 15.

The array topology of FIG. 4 provides significantly reduced common-wavelength crosstalk as compared to prior art array topologies. For example, if four (4) sub-arrays 12 are used, each having eight (8) interferometers (implemented using sixteen (16) Bragg gratings and eight (8) lengths of sensing optical fiber 25), then 32 interferometer sensor elements are multiplexed along the length of the optical fiber 15. However, at any given characteristic wavelength $\lambda_n$ there are only four (4) interferometers that can interfere with one another. By properly selecting the path length (length of optical fiber) between the various sub-arrays 12, the return signals from interferometers having the same characteristic frequency can be timed to minimize the potential for common-wavelength crosstalk.

The array crosstalk limitations can be further significantly eased utilizing a hybrid array configuration. Referring to the array topology of FIG. 5, the array is formed by incorporating branching couplers 50 into the array to couple light from the input fiber 55 to a plurality of branches 56, 57, 58. Each branch 56, 57, 58 includes a sub-arrays (serial arrays) 59 of interferometers 60. Each interferometer 60 in a particular sub-array has a different characteristic wavelength $(\lambda_1, \lambda_2, \ldots, \lambda_n)$ from all of the other interferometers 60 in the sub-array. Common-wavelength crosstalk is eliminated in the configuration of FIG. 5 because the primary optical return from each interferometer 60 never passes through another interferometer 60 having the same characteristic wavelength $\lambda_v$.

Figure 5:
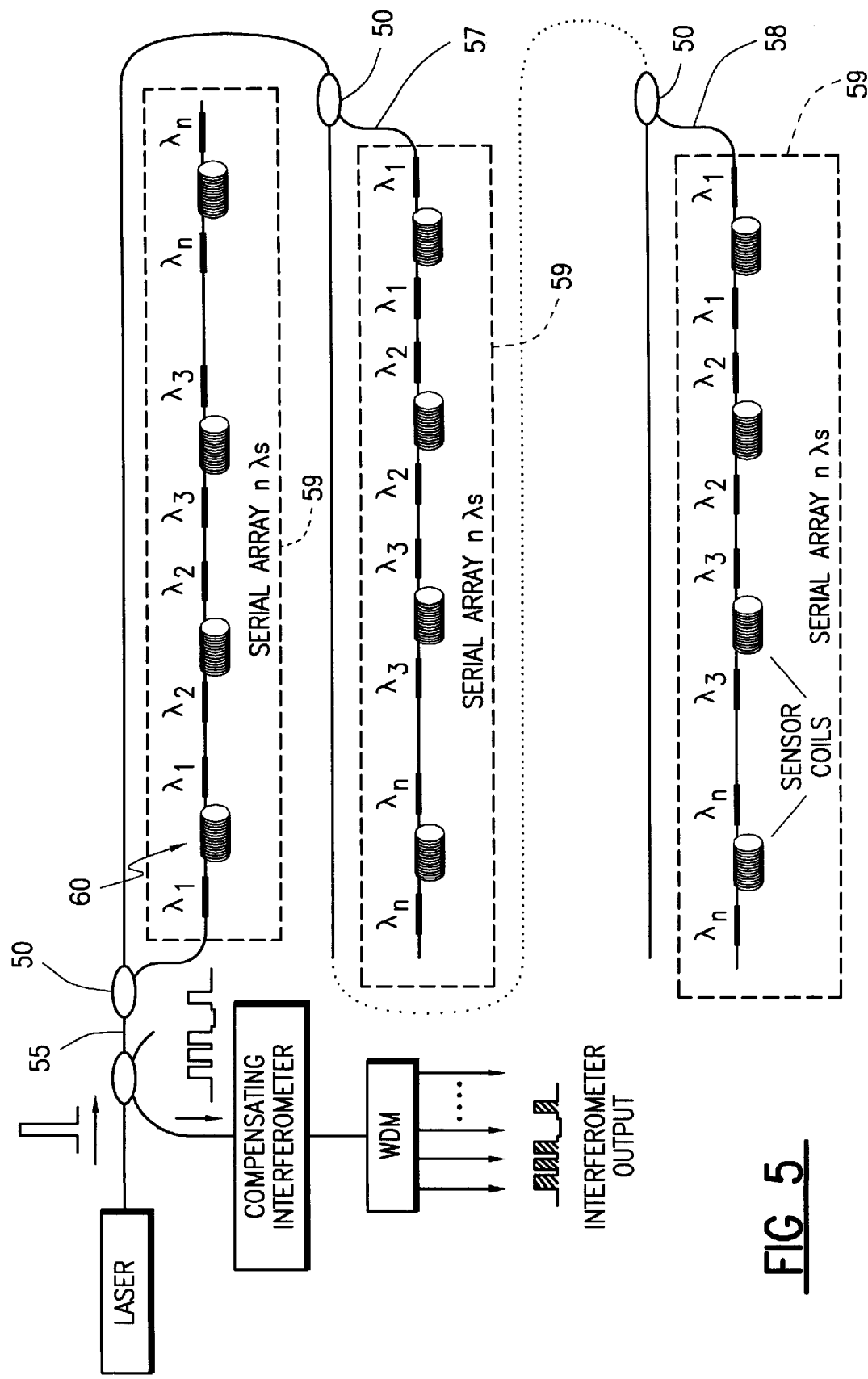
FIG. 5 is a schematic block diagram of a multiplexed interferometer system utilizing a second embodiment of a serial fiber Bragg grating interferometer array in accordance with the present invention.
Figure 6:
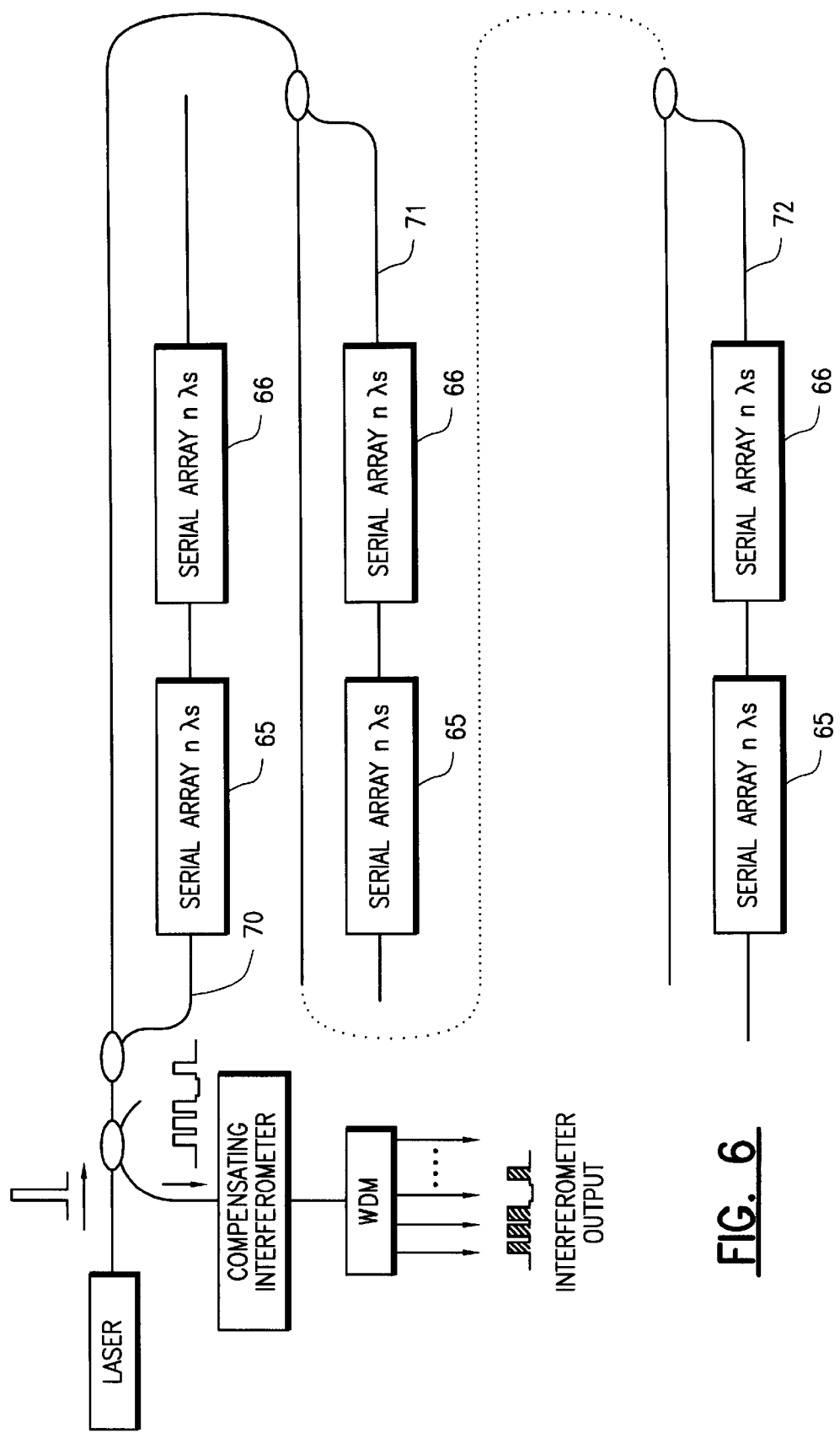
FIG. 6 is a schematic block diagram of a multiplexed interferometer system utilizing a third embodiment of a serial fiber Bragg grating interferometer array in accordance with the present invention.

Referring now to FIG. 6, the array topology of FIG. 5 can be extended to allow a limited series of sub-arrays 65, 66 in each branch 70, 71, 72. The characteristic wavelength of sensors in one sub-array 65 may be repeated in the other sub-array 66. In this configuration, there is only very limited common-wavelength crosstalk. For example, if two sub-arrays 65, 66 are connected in series in each branch 70, 71, 72, then there is only one other sensor in each branch having the same characteristic wavelength of any other sensor in that branch. This will produce only very limited common-wavelength crosstalk. If the number of sensors in each sub array is kept low (for example eight (8) interferometers at eight (8) different characteristic frequencies), with two (2) sub-arrays in each branch, the common-wavelength crosstalk is very small, and most likely negligible. With eight (8) wavelengths, and eight (8) branching couplers, a total of one hundred and twenty-eight (128) sensors are capable of being supported along the fiber. Increasing the number of wavelengths or branching arms in the array increases the total number of sensors addressable. This represents a significant improvement in the practicality of the serial fiber Bragg grating interferometer approach.

Referring again to FIG. 5, when using such a branching configuration, the power level in the optical returns from the most distal sensors in the array (i.e., the sensors in the distal branch 58) will be very weak compared to those from the first sub-array 56. This arises due to the losses that accumulate as the light passes down the array through the couplers and splices and back to the compensating interferometer and detection system. This effect can be partially compensated for by increasing the reflectivity of the fiber Bragg grating elements at the more distal points in the array. For example, the fiber Bragg gratings in the first branch 56 may be one percent (1%) reflective, while the fiber Bragg gratings in the last branch 58 may be made two percent (2%) reflective. This is only provided for illustrative purposes, and each array may be customized to account for losses in the couplers and splices for a given array configuration.

Figure 7:
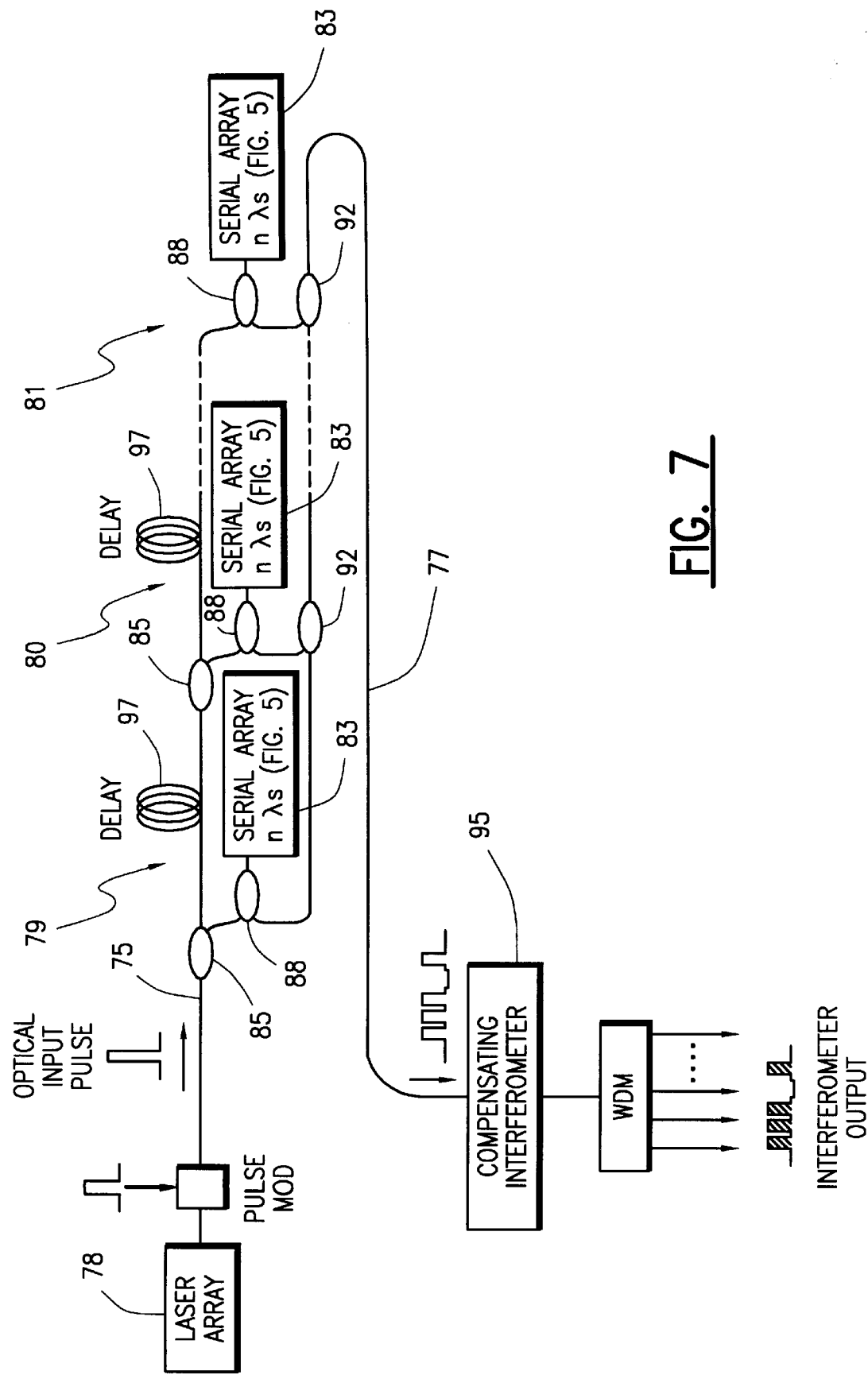
FIG. 7 is a schematic block diagram of a multiplexed interferometer system utilizing a fourth embodiment of a serial fiber Bragg grating interferometer array in accordance with the present invention.

An alternative array topology is illustrated in FIG. 7. Referring to FIG. 7, the hybrid nature of the array is taken a step further wherein an input bus fiber 75 and an output bus fiber 77 are incorporated into the array configuration. Light is provided by an input light source 78 to successive branches 79, 80, 81 in the array. Each branch 79, 80, 81 includes one or more sub-arrays 83. The light for each branch 79, 80 in the array, except for the last branch in the array 81, is split from the input bus fiber 75 into the branch 79, 80 via a coupler 85. Each branch 79, 80, 81 includes a directional coupler 88 that provides the input light from the input bus fiber 75 to the sub-array(s) in the branch. The light for the sub-array 80 in the last branch 81 is provided directly from the input bus fiber 75 to the directional coupler 88. The return optical signals from the sub-array(s) in each branch pass back through the coupler 88 to the output bus fiber 77. Light from the sub-array(s) in the first branch 79 is provided directly to the output bus fiber 77 via the coupler 88. Light from the sub-arrays in the remaining branches 80, 81 are coupled in a forward sense onto the output bus fiber 77 via couplers 92.

The forward coupling of the signals ensures that every path through each of the sensor arrays experiences approximately an equal number of couplers, thereby naturally equalizing the losses. The first and last branches in the array each have one less coupler. However, this difference is not significant. In the array configuration of FIG. 7 described thus far, each input optical signal traverses approximately the same length of optical fiber, and therefore, the return optical signals from the various arrays 80 would arrive at the compensating interferometer 95 at approximately the same instant in time. In order to utilize the technique of time division multiplexing to differentiate between the return optical signals from the various arrays 80, optical delay elements 97 are inserted in the input optical fiber between each branch (after each coupler 85). Each delay element 97 may simply be a long length of optical fiber, e.g., 40 meters of optical fiber, to provide the desired delay such that the return optical signals from the various sub-arrays 80 arrive at the compensating interferometer 95 at different times.

The array topology of FIG. 7 produces low crosstalk and balanced optical returns while employing a topology with only a limited number of fiber couplers (e.g. 3 per 'sub-array'). For a sub array of 16 sensors, this translates to approximately 0.18 couplers/sensor. This compares to approximately four (4) couplers/sensor in a conventional Mach-Zehnder ladder array topology.

As with the array configuration of FIG. 5, each branch in the array configuration of FIG. 7 may include more than one sub-array of interferometers connected in series. The overall number of sensors in the array configuration is determined based upon the number of branches to sub-arrays, the number of sensors per sub-array, and the number of sub-arrays per branch.

The invention has been described herein as utilizing fiber Bragg grating interferometers as sensors. However, the array topologies of the invention are also applicable to fiber Bragg grating laser sensors. In such a configuration, the sensing length of optical fiber is doped with a rare earth material, such as erbium, to thereby create fiber Bragg grating laser sensors.

Although the invention has been described and illustrated with respect to exemplary embodiments thereof, the foregoing and various other additions and omissions may be made therein and thereto without departing from the spirit and scope of the present invention.

I claim:

1. An interferometer array, comprising:

a plurality of interferometer sub-arrays, each sub-array including a plurality of interferometers, each interferometer being implemented with a respective pair of fiber Bragg gratings and a sensing length of optical fiber positioned between said respective pair of fiber Bragg gratings, said fiber Bragg gratings in each respective pair of fiber Bragg gratings having the same characteristic wavelength that is different from the characteristic wavelength of every other pairs of fiber Bragg gratings in said sub-array; and sub-array interconnection means interconnecting said sub-arrays to one another to form said interferometer array, said sub-array interconnection means including optical signal delay means for delaying signals from one pair of fiber Bragg gratings in one sub-array with respect to each pair of fiber Bragg gratings in other sub-arrays having the same characteristic wavelength as the characteristic wavelength of the one pair of fiber Bragg gratings;

wherein said optical signal delay means of said sub-array interconnections means minimizes the common-wavelength crosstalk between the interferometers in the interferometer array.

2. The interferometer array of claim 1, wherein said sub-array interconnection means includes a series connection of said sub-arrays along a common length of optical fiber, and wherein said optical signal delay means includes a length of optical fiber between said sub-arrays selected to provide a desired time delay to minimize said common-wavelength crosstalk.

3. The interferometer array of claim 1, wherein said sub-array interconnections means includes:

an input/output optical fiber; and a plurality of branches each interconnected to said input/output optical fiber via optical coupling means;

wherein each one of said plurality of branches includes one or more of said sub-arrays connected in series; and wherein said optical signal delay means includes a length of said input/output optical fiber positioned between each of said optical coupling means.

4. The interferometer array of claim 3, wherein the reflectivity of each of said fiber Bragg gratings is selected such that primary optical return signals from each of said fiber Bragg gratings are generally balanced with respect to one another in terms of power.

5. The interferometer array of claim 1, wherein said sub-array interconnection means includes:

an input optical fiber;

an output optical fiber; and a plurality of branches interconnected between said input optical fiber and said output optical fiber by optical coupling means;

wherein each one of said plurality of branches includes one or more of said sub-arrays connected in series, and wherein said optical signal delay means is connected in said input optical fiber between the interconnection of said input optical fiber to each one of said branches.

6. The interferometer array of claim 5, wherein said optical signal delay means incrementally increase the delay experienced by an input optical signal before it reaches each successive branch connected to said input optical fiber.

7. An optical system, comprising:

a light source for providing an input optical signal; and an interferometer array connected to said light source by an optical fiber, said interferometer array including:

(a) a plurality of interferometer sub-arrays, each sub-array including a plurality of interferometers, each interferometer being implemented with a respective pair of fiber Bragg gratings and a sensing length of optical fiber positioned between said respective pair of fiber Bragg gratings, said fiber Bragg gratings in each respective pair of fiber Bragg gratings having the same characteristic wavelength that is different from the characteristic wavelength of every other pair of fiber Bragg gratings in said sub-array; and (b) sub-array interconnection means interconnecting said sub-arrays to one another to form said interferometer array, said sub-array interconnection means including optical signal delay means for delaying signals from one pair of fiber Bragg gratings in one sub-array with respect to each pair of fiber Bragg gratings in other sub-arrays having the same characteristic wavelength as the characteristic wavelength of the one pair of fiber Bragg gratings;

(c) wherein said optical signal delay means of said sub-array interconnection means minimizes the common-wavelength crosstalk between the interferometers in the interferometer array;

wherein each fiber Bragg grating is responsive to said input optical signal for providing a primary optical return signal.

8. The optical system of claim 7, further comprising detection means for detecting said primary optical return signals, said detection means providing a plurality of interference signals, each interference signal being produced by the primary optical return signals from a pair of fiber Bragg gratings forming an interferometer, said interference signals being related to phase perturbations in each sensing length of optical fiber.

9. The optical system of claim 8, wherein said detection means includes:

a compensating interferometer connected to receive said primary optical return signal for providing said interference signals; and filter means for differentiating between interference signals produced by different interferometers in each sub-array.

10. The optical system of claim 7, wherein said sub-array interconnection means includes a series connection of said sub-arrays along a common length of optical fiber, and wherein said optical signal delay means includes a length of optical fiber between said sub-arrays selected to provide a desired time delay to minimize said common-wavelength crosstalk.

11. The optical system of claim 7, wherein said sub-array interconnection means includes:

an input/output optical fiber; and a plurality of branches each interconnected to said input/output optical fiber via optical coupling means;

wherein each one of said plurality of branches includes one or more of said sub-arrays connected in series; and wherein said optical signal delay means includes a length of said input/output optical fiber positioned between each of said optical coupling means.

12. The optical system of claim 11, wherein the reflectivity of each of said fiber Bragg gratings is selected such that primary optical return signals from each of said fiber Bragg gratings are generally balanced with respect to one another in terms of power.

13. The optical system of claim 12, wherein said input optical signal traverses a length of optical fiber to reach each of said fiber Bragg gratings in said array, and wherein the reflectivity of a respective fiber Bragg gratings connected closer to said light source such that said input optical signal traverses a short length of optical fiber to reach said respective fiber Bragg grating is less than the reflectivity of said fiber Bragg gratings connected distal to said light source.

14. The optical system of claim 7, wherein said sub-array interconnection means includes:

an input optical fiber;

an output optical fiber; and a plurality of branches interconnected between said input optical fiber and said output optical fiber by optical coupling means;

wherein each one of said plurality of branches includes one or more of said sub-arrays connected in series; and wherein said optical signal delay means is connected in said input optical fiber between the interconnection of said input optical fiber to each one of said branches.

15. The optical system of claim 14, wherein said optical signal delay means incrementally increase the delay experienced by an input optical signal before it reaches each successive branch connected to said input optical fiber.

16. The optical system of claim 15, wherein said branches are coupled to said output optical fiber in a forward sense by said optical coupling means.

17. The optical system of claim 14, wherein said branches are coupled to said output optical fiber in a forward sense by said optical coupling means.

* * * * *